United States Patent [19]

Elswood

[11] 4,110,731
[45] Aug. 29, 1978

[54] VIBRATION TRANSDUCER WITH IMPROVED VISCOUS DAMPING

[75] Inventor: Ebbert Lee Elswood, Sierra Madre, Calif.

[73] Assignee: Bell & Howell Company, Chicago, Ill.

[21] Appl. No.: 755,536

[22] Filed: Dec. 30, 1976

[51] Int. Cl.² .............................................. G01V 1/16
[52] U.S. Cl. .................................. 340/17 R; 340/8 LF
[58] Field of Search .............. 340/17 R, 17 SP, 8 LF, 340/8 PC, 9, 11; 310/15

[56] References Cited

U.S. PATENT DOCUMENTS

| | | | |
|---|---|---|---|
| 2,311,079 | 2/1943 | Parr, Jr. | 340/17 R |
| 3,103,603 | 9/1963 | Reutter | 310/15 X |
| 3,274,538 | 9/1966 | Snavely | 340/8 LF |
| 3,328,752 | 6/1967 | Sims | 340/8 LF X |
| 3,582,874 | 6/1971 | Fedoseenko | 340/17 X |

Primary Examiner—Maynard R. Wilbur
Assistant Examiner—T. M. Blum
Attorney, Agent, or Firm—Benoit Law Corporation

[57] ABSTRACT

A vibration transducer has a cylinder for enclosing a viscous damping medium. A seismic mass in the form of a piston is mounted in the cylinder for axial oscillation with the aid of a spring suspension which is flexible in an axial direction and has its maximum stiffness at right angles to that axial direction to retain the piston against radial movement relative to the cylinder. A mounting post extends through a bore in the piston and the spring suspension includes a bridge extending from one side to the opposite side of the piston. The axial oscillation of the piston is damped with the aid of floating seals between the piston and cylinder, between the piston and the mounting post and between the piston and the spring suspension bridge. These floating seals impede the flow of the viscous damping medium past the piston while at the same time avoiding static friction between the moving parts and the piston of the vibration transducer.

13 Claims, 6 Drawing Figures

VIBRATION TRANSDUCER WITH IMPROVED VISCOUS DAMPING

BACKGROUND OF THE INVENTION

1. Field of the Invention

The subject invention relates to vibration transducers having a seismic mass damped with a viscous medium.

2. Description of the Prior Art

Many types of prior-art transducers employ bearings for mounting a seismic mass with respect to a relatively stationary transducer part. In practice, the friction of such bearings causes distortion of the transducer signal. Also, the use of bearings introduces a minimum drive level to overcome static friction before the transducer starts to perform properly. Moreover, the inevitable wear of bearings shortens transducer life.

A more advantageous prior-art vibration transducer avoids bearing friction by suspending the seismic mass between spring systems which are flexible in an axial direction of the mass but have their maximum stiffness at right angles to such axial direction. Typically, the spring systems are interconnected by a bridge which extends past the seismic mass. This assembly is enclosed in a housing.

In most practical applications, the air in the housing would not be sufficient for a satisfactory damping of the seismic mass. Rather, the seismic mass has to be immersed in a viscous liquid, typically oil, for providing the requisite damping characteristics.

In many applications the latter type of transducers is satisfactory and, indeed, has been manufactured and sold for many years by Bell & Howell Company as Vibration Transducers Types 4-102-0001 and 4-103-0001, for instance.

However, the presence of a viscous liquid, typically oil, as a damping medium in the transducer has become an impediment in a growing number of applications. For instance, positive hermetic sealing is required to prevent loss of the damping liquid over the entire operating range. The transducer has to be equipped with a special expansion cell to compensate for the thermal expansion of the damping liquid when temperature rises. Even with these precautions and additional features, the useful temperature range of the transducer is inevitably limited both in the direction of relatively low temperatures and in the direction of high temperatures. In fact, use of a damping oil tends to restrict the useful temperature operating range of a vibration transducer to temperature spans which are even narrower than the span between water freezing and boiling temperatures.

On the other hand, use of a damping medium, such as air or another gas, which would not subject the transducer to the above mentioned disadvantages of damping oils, would on the basis of existing transducer technology necessitate a return to bearings for impeding the flow of the damping medium past the seismic mass.

This, of cours, would reintroduce the above mentioned serious disadvantages of bearing devices in vibration transducers.

SUMMARY OF THE INVENTION

It is a general object of this invention to overcome the above mentioned disadvantages.

It is a related object of the invention to provide vibration transducers with improved viscous damping facilities.

It is a germane object of this invention to provide improved vibration transducers for use with gaseous or similar low-viscosity damping media.

It is also an object of this invention to improve the structure and configuration of transducers.

It is a further object of this invention to provide transducers operable at low temperatures below freezing and at high temperatures in the 1,000° F or 500° C area.

It is a germane object of this invention to increase the operating range of transducers in terms of environmental temperature, and to increase transducer life.

Other objects of this invention will become apparent in the further course of this disclosure.

By way of background, the seismic mass or piston in the transducer cylinder oscillates in that cylinder relative to the attached vibrating apparatus into the resonance region of the transducer. Above the resonance or natural frequency of the system, the mass or piston tends to become relatively stationary and the cylinder appears to oscillate relative to the mass. Accordingly, expressions such as "axial oscillation in the cylinder means" and other statements suggesting movement of the mass or piston, as herein employed, are to be understood in terms of relative movement between mass or piston and cylinder.

From a first aspect thereof, the subject invention resides in a vibration transducer comprising, in combination, cylinder means for enclosing a viscous damping medium, piston means in said cylinder means having an outside diameter smaller than the inside diameter of said cylinder means and having a seismic mass, means for mounting said piston means for axial oscillation in said cylinder means, means for damping said oscillation of the piston means with said viscous damping medium, including a piston ring having an outside diameter larger than the outside diameter of said piston means to impede flow of said viscous damping medium relative to said oscillating piston means, but smaller than the inside diameter of said cylinder means to provide clearance between said piston ring and said cylinder means, and means operatively associated with said piston means for sensing said damped oscillation.

From another aspect thereof, the subject invention resides in a vibration transducer comprising, in combination, a seismic mass, cylinder means for enclosing a viscous damping medium and housing said seismic mass, means for mounting said seismic mass for oscillation in said cylinder, including first and second spring suspension means, means for mounting said first suspension means on one side of said mass and said second suspension means on another side of said mass, means for suspending said mass between said mounted first and second spring suspension means, and a bridge extending between said first and second spring suspension means and having a rod extending through and at a clearance to said mass, means for damping said oscillation of the mass with said viscous damping medium, including an annulus about said rod having an inside diameter smaller then said clearance to impede flow of said viscous damping medium through said clearance, but larger than the diameter of said rod to provide clearance between the annulus and the rod, and means operatively associated with said mass for sensing said damped oscillation.

From another aspect thereof, the subject invention resides in a vibration transducer comprising, in combination, cylinder means for enclosing a viscous damping medium, piston means in said cylinder means having an axial bore and an outside diameter smaller than the inside diameter of said cylinder means and having a seismic mass, means for mounting said piston means for axial oscillation in said cylinder means including a support having a post extending through said axial bore and having a diameter smaller than the diameter of said bore, a bridge having a first end portion, a second end portion and a rod extending between said first and second end portions and through said piston means at a clearance to said piston means, a first C-shaped spring connected to and extending between said support and said first end portion of the bridge, a second C-shaped spring connected to and extending between said piston means and said first end portion of the bridge, a third C-shaped spring connected to and extending between said piston means and said second end portion of the bridge, and a fourth C-shaped spring connected to and extending between said support and said second end portion of the bridge, means for damping said oscillation of the piston means with said viscous damping medium, including a piston ring having an outside diameter larger than the outside diameter of said piston means to impede flow of said viscous damping medium relative to said oscillating piston means, but smaller than the inside diameter of said cylinder means to provide clearance between said piston ring and said cylinder means, piston ring retaining means in said piston means including a peripheral channel for receiving part of said piston ring having an inside diameter smaller than the inside diameter of said piston ring and a height larger than the height of said piston ring whereby said piston ring is floating relative to said piston means and said cylinder means, a first annulus about said post having an inside diameter smaller than the inside diameter of said bore to impede flow of said viscous damping medium through said bore, but larger than said diameter of said post to provide clearance between the first annulus and the post, and first annulus retaining means in said piston means defining a first annular chamber for receiving part of said first annulus having a diameter larger than the outside diameter of the first annulus and a height larger than the height of the first annulus whereby the first annulus is floating relative to the piston means and said post, a second annulus about said rod having an inside diameter smaller than the clearance at which said rod extends through the piston means to impede flow of said viscous damping medium through the latter clearance, but larger than the diameter of said rod to provide clearance between the annulus and the rod, and second annulus retaining means in said piston means defining a second annular chamber for receiving part of said second annulus having a diameter larger than the outside diameter of the second annulus and a height larger than the height of the second annulus whereby the second annulus is floating relative to the piston means and said rod, and means operatively associated with said piston means for sensing said damped oscillation.

From another aspect thereof, the subject invention resides in a vibration transducer comprising, in combination, cylinder means for enclosing a viscous damping medium, piston means in said cylinder means having an outside diameter smaller than the inside diameter of said cylinder means and having a seismic mass, means for mounting said piston means for axial oscillation in said cylinder means including spring suspension means being flexible in an axial direction in said cylinder means and having maximum stiffness at right angles to said axial direction to retain said piston means against radial movement relative to said cylinder means, means for damping said oscillation of the piston means with said viscous damping medium including a floating seal between said piston means and said cylinder means, and means operatively associated with said piston means for sensing said damping oscillation.

BRIEF DESCRIPTION OF THE DRAWINGS

The subject invention and the various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
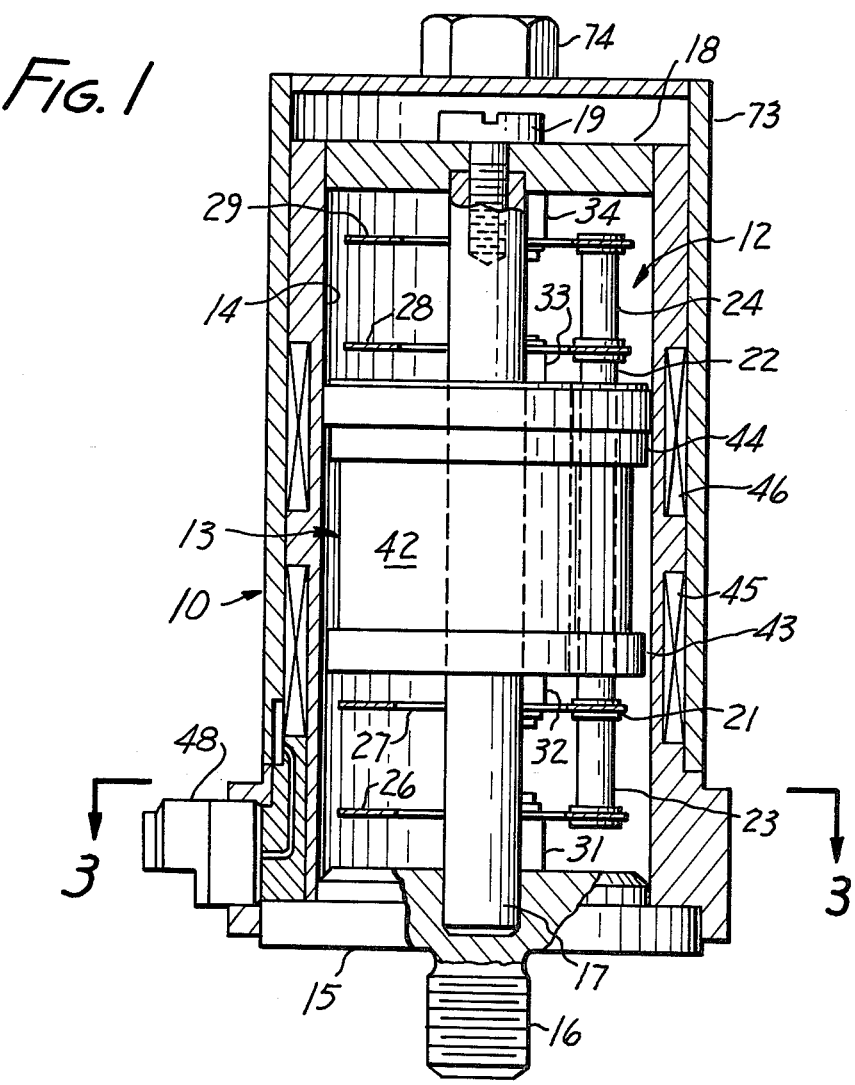
FIG. 1 is an elevation, partially in section, of a vibration or velocity transducer in accordance with a preferred embodiment of the subject invention.

The vibration or velocity transducer shown in the drawings has utility in a great variety of applications, such as seismic or vibration measurements or monitoring, velocity measurements, displacement measurements and the like. Specific applications include vibration monitoring on fans, heavy rotating machinery, aircraft and other engines, pipelines, high-temperature and other turbines, and dynamic balancing equipment. However, the subject invention and its applications are not limited to any specific field of application or, indeed, to any specific type of transducer.

The high temperature, frictionless, viscous damped velocity or vibration transducer 10 shown in the drawings has a spring suspended mass assembly 12 mounted for axial oscillation of a seismic mass 13 in a hollow-cylindrical bobbin support or cylinder 14.

In particular, the transducer 10 has a circular, stepped mounting plate 15 equipped with a threaded bolt or stud 16 for attachment to any machine or other structure the vibration, velocity, displacement or other parameter of which is to be transduced to a measurable or monitorable electric signal.

Instead of the stud 16, screws or other suitable fasteners may be employed for attachment of the transducer.

A cylindrical mounting post rises from a central bore in, and perpendicularly to, the mounting plate 15 and may be attached to the mounting plate 15 by welding, brazing or any other desired technique. At its top end opposite the base mounting plate 15, the vertical post 17 carries a circular top mounting plate 18 which is attached to the post by a screw or other fastener 19.

The top mounting plate 18 assists the base mounting plate 15 in mounting the bobbin support cylinder 14, with that cylinder 14, base mounting plate 15 and/or top mounting plate 18 constituting a means for enclosing a viscous damping fluid or medium 21. If desired, the parts 14, 15 and 18 may be welded or brazed into a solid unit around the mass-spring assembly 12.

If the bobbin support 14 is used as a cylinder, then the seismic mass 13 may be considered a piston oscillating axially in the cylinder 14 containing the viscous damping medium. Viewed another way, the component 13 may be used as a piston having the seismic mass of the transducer 10.

Figure 4:
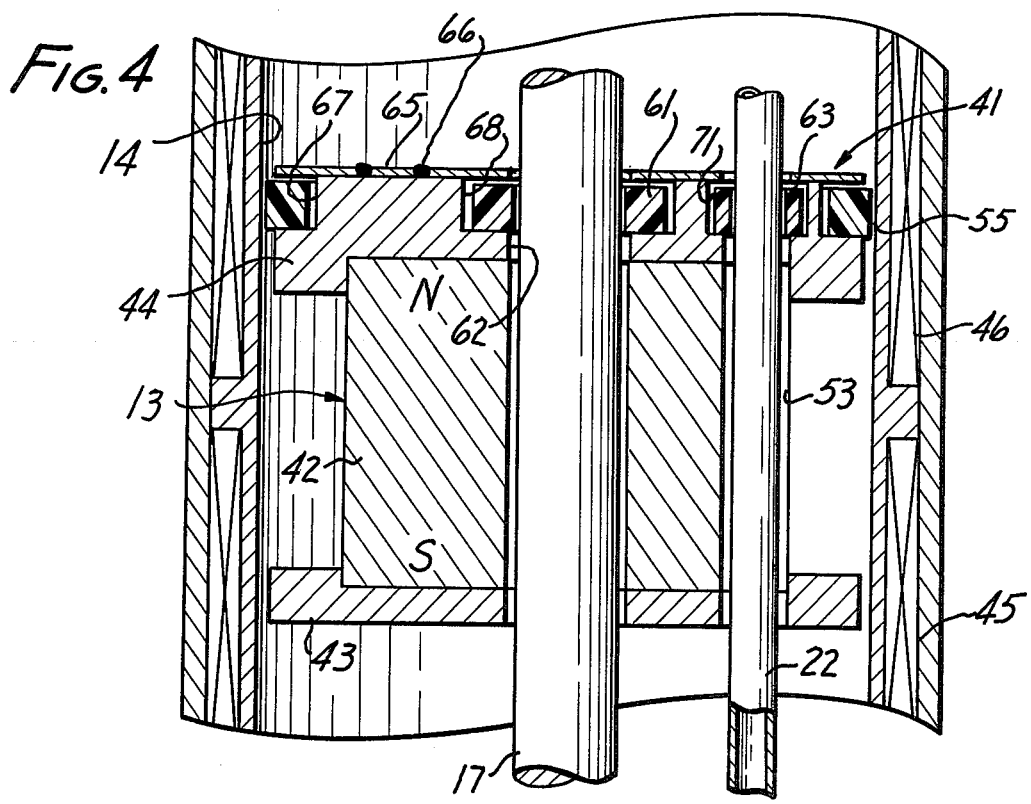
FIG. 4 is an elevation similar to FIG. 1, on an enlarged scale, showing the seismic mass region of the transducer in greater detail.
Figure 2:
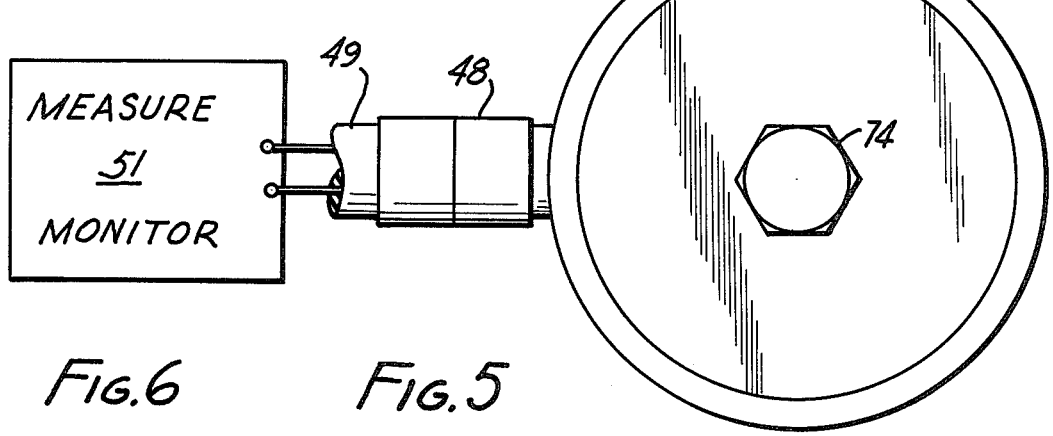
FIG. 2 is a top view of the transducer shown in FIG. 1.

The spring suspension assembly of the transducer includes a bridge 22 in the form of a rod extending between first and second end portions 23 and 24 of the bridge. As best seen in FIG. 4, the bridge or rod 22 is preferably formed by a thin-walled tube to minimize the mass of the spring suspension bridge and thus the influence of that mass on the transducer output signal.

Also, with the type of spring suspension used in the illustrated transducer, the travel of the bridge essentially is only one half the travel of the mass 13 during axial oscillation of that mass in the cylinder 14.

The spring-mass assembly 12 further includes four C-shaped flat leaf springs 26, 27, 28 and 29 which are preferably cut from flat leaf spring stock.

Figure 3:
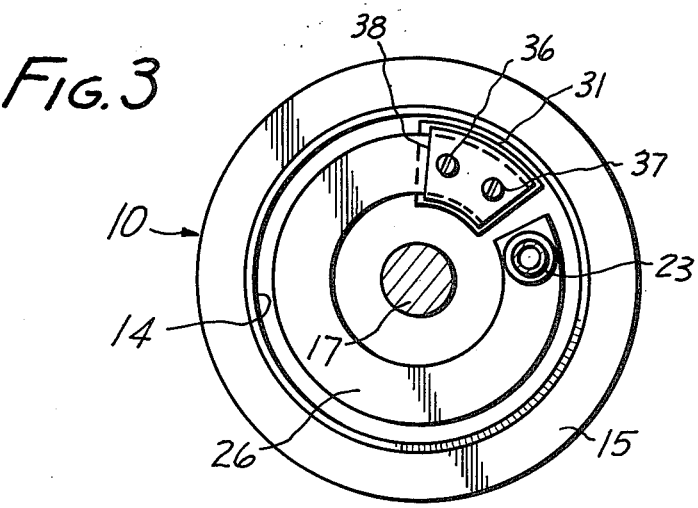
FIG. 3 is a section taken along line 3 — 3 in FIG. 1, with a bobbin casing and outer housing not being shown for increased clarity of the illustrated parts.

As seen in FIGS. 1 and 3, the first spring 26 is connected to and extends between the support plate 15 and the first end portion 23 of the bridge 22. The second spring 27 is connected to and extends between the mass or piston 13 and the first bridge end portion 23. The third spring 28 is connected to and extends between the mass or piston 13 and the second end portion 24 of the bridge 22. The fourth spring 29 is connected to and extends between the top support plate 18 and the second bridge end portion 24.

In particular, each of the springs 26 to 29 is brazed to the corresponding end portion of the bridge 22. Also, each of the springs 26, 27, 28 and 29 has associated therewith a mounting block or spacer 31, 32, 33, and 34, respectively.

Two screws or other fasteners 36 and 37 extend through a spring clamp 38, through the spring 26 and the mounting block or spring spacer 31 into corresponding threaded holes in the base plate 15 in order to attach the first spring 26 to that plate. The second and third springs 27 and 28 are similarly attached to the mass or piston 13 via blocks or spacers 32 and 33. The fourth spring 29 is similarly attached to the top mounting plate 18 via block or spacer 34.

Because of their illustrated configuration and mounting, the spring suspension or springs 26 to 29 are readily flexible in the axial direction of the cylinder 14 or post 17, but have or present maximum stiffness at right angles to that axial direction. This is an important feature of the illustrated combination, in that it retains the mass or piston 13 against radial movement relative to the cylinder 14, thereby avoiding frictional scraping and sticking and contributing to the success of the floating seal damping assistance structure 41 of the subject invention.

In this respect, and as best seen in FIG. 4, the mass or piston 13 includes a cylindrical axially polarized magnet 42 extending between spaced ferromagnetic circular pole piece plates 43 and 44 which magnetically act on two inductive coils or bobbins 45 and 46 which are wound in opposite directions in corresponding recesses of the bobbin support cylinder 14 to reduce inductive pickup from stray magnetic fields and insure accurate readings of the electric signal inductively generated during vibration of the magnetic mass 13 and supplied via a transducer terminal 48 and cable 49 to electrical measurement or monitor equipment 51. Primarily, the bobbins are wound in opposite directions for maximum signal generation.

Even though the illustrated type of spring suspension can readily be manufactured to withstand transverse accelerations above 30g and to retain its characteristics throughout rough handling of the transducer unit, care has to be taken that any friction, scraping or sticking between relatively moving and stationary parts of the transducer is affirmatively avoided. To this end, even the maximum outside diameter of the mass or piston 13 at the pole pieces 43 and 44 is kept smaller than the inside diameter of the cylinder 14 so that there is sufficient annular clearance between the piston and the cylinder to exclude any contact between the two during operation or rugged handling. Similarly, the minimum inside diameter of the mass or piston 13 at the pole piece 44 or at any other of the pieces 43 and 44 of the mass 13 is made larger than the outside diameter of the mounting post 17. The post 17 thus extends through an axial bore in the piston or mass 13 and has a diameter smaller than the smallest diameter of that bore so as to leave sufficient clearance between the piston 13 and mounting post 17 to exclude positively any contact between the two during operation or rugged handling of the transducer.

Also, the spring suspension bridge 22 is disposed and maintained at a distance from or clearance to the mass or piston 13. For instance, the bridge 22 may extend through a slot 53 and corresponding registering bores in the magnet 42 and pole pieces 43 and 44.

With these various clearances, the transducer damping potential, as well as the suitability of various damping media would still be restricted in practice.

To provide for a more effective damping and to extend the range of suitable damping media into the low viscosity range, the transducer is equipped with a floating seal assembly 41, preferably providing floating seals between the mass or piston 13 on the one hand and the cylinder 14, mounting post 17 and spring suspension bridge 22, on the other hand.

In accordance with the illustrated preferred embodiment of the subject invention, the floating seal assembly 41 includes a piston ring 55 having an outside diameter larger than the maximum outside diameter of the mass or piston 13 to impede flow of the viscous damping media 21 relative to the oscillating mass or piston, but smaller than the inside diameter of the cylinder 14 to provide clearance between that piston ring 55 and the cylinder 14. It is thus seen that the term "piston ring" as herein employed for the part 55 does not in all respects have the same significance in the subject transducer environment as the general meaning of that term in the automotive industry, where piston rings typically have the same diameter as the cylinder of an automotive engine in order to provide a tight seal between the piston and cylinder structures, with the piston ring peripherally engaging the inner surface of the automotive cylinder and working therealong at considerable friction.

Figures 5, 6:
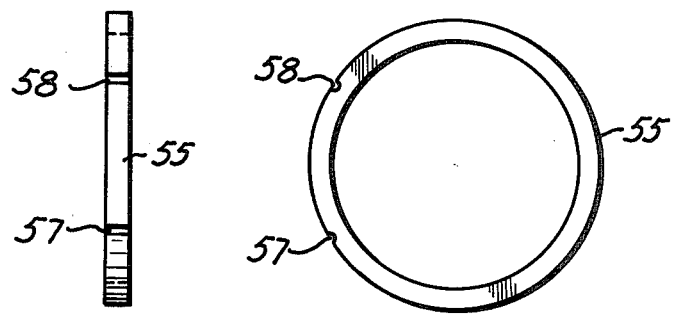
FIG. 5 is a top view, on an enlarged scale, of a piston ring employed in the transducer shown in FIG. 1.
FIG. 6 is a side view of the piston ring shown in FIG. 5.

In practice, the transducer may be built for the maximum damping required in a given range of applications, and such damping may then be calibrated downwardly as required by a cutting of notches into, or formation of similar peripheral recesses on, the piston ring as shown at 57 and 58 in FIGS. 5 and 6.

The illustrated floating seal assembly 41 further includes a ring or annulus 61 about the mounting post 17. The annulus 61 has an inside diameter smaller than the inside diameter of the bore 62 through the pole piece 44, to impede flow of the viscous damping medium through that bore, but larger than the diameter of the post 17 to provide clearance between the annulus 61 and the post 17.

Similarly, the floating seal assembly 41 includes a further ring or annulus 63 having an inside diameter smaller than the clearance at which the bridge rod 22 extends through the mass or piston 13 to impede the flow of the viscous damping medium 21 through the latter clearance, but larger than the diameter of the rod 22 to provide clearance between the annulus and the shaft.

In practice, the clearances between the rings or annuli 55, 61 and 63 and the adjacent structure 14, 17 or 22 may be, for instance, as little as ⅓ thousandth of an inch or about 10μ up to about five-hundredths of an inch or approximately 1mm. This by way of example, rather than by way of limitation.

The floating seal assembly 41 further includes a thin circular ring retention plate 65 which is spot welded or otherwise fastened to the pole piece 44, as indicated at 66. The pole piece 44 and attached retainer plate 65 jointly form a ring retaining structure in the mass or piston 13 defining a peripheral channel 67 for receiving part of the piston ring 55 and having an inside diameter smaller than the inside diameter of the piston ring and a height in the axial direction of the assembly larger than the height of the piston ring whereby the piston ring 55 is floating relative to the pole piece 44 and thus relative to the mass or system 13 and cylinder 14.

The annulus retaining structure formed by the pole piece 44 and attached retainer plate 65 also defines an annular chamber 68 for receiving part of the annulus 61. This annular chamber 68 has a diameter larger than the outside diameter of the annulus 61 and a height larger than the height of the annulus 61, whereby that annulus is floating relative to the pole piece 44 and thus relative to the mass or piston 13 and mounting post 17.

The annulus retention structure formed by the pole piece 44 and attached plate 55 further defines another annulus retaining chamber 71 for receiving part of the annulus 63.

The chamber 71 has a diameter larger than the outside diameter of the corresponding annulus 63 and a height larger than the height of that annulus, whereby the annulus 63 is floating relative to the pole piece 44 and thus relative to the mass or piston 13 and spring suspension rod 22.

This floating nature of the rings or annuli 55, 61 and 63 readily excludes any noticeable static and dynamic friction that could detrimentally affect the transducer output signal.

If desired, similar floating seals may be provided in the lower pole piece 43, or the floating seals may otherwise by distributed among the pole pieces 43 and 44. In either case, the electromagnetic assembly including the bobbins 45 and 46 will sense the oscillation of the mass 13 as damped with the aid of the floating seal assembly 41 impeding flow of the viscous damping medium past the mass 13. The floating seal assembly 41 may thus be considered as in effect dividing the inside of the cylinder 14 into upper and lower chambers in which the damping medium is constrained except for the very small clearances remaining at the floating seals.

In practice, the mass in the oscillating transducer will exhibit a certain lateral sway despite the transverse rigidity of the spring suspension system. The floating nature of the seals at 55, 61 and 63 permits an accommodation of such sway without scraping, friction or objectionable damping medium flow past the mass or piston.

In practice, this permits the use of air or of another gaseous damping medium in the transducer 10. This not only obviates the need for special expansion chambers, but also removes the low and high temperature limitations, as well as temperature range restrictions, commonly associated with the use of high-viscosity oils and similar liquids in the transducer.

In practice, the transducer 10 may be provided with a hollow-cylindrical cover 73 which may be brazed or welded to the bobbin support cylinder. The cover 73 may be provided with a hexagonal head 74 for engagement by a wrench by means of which the transducer may be attached to various structures via the threaded stud 16.

Various modifications and variations within the spirit and scope of the subject invention will become apparent from or be suggested by the subject extensive disclosure to those skilled in the art.

I claim:

1. A vibration transducer comprising in combination:
cylinder means for enclosing a viscous damping medium;
piston means in said cylinder means having an outside diameter smaller than the inside diameter of said cylinder means and having a seismic mass;
means for mounting said piston means for axial oscillation in said cylinder means;
means for damping said oscillation of the piston means with said viscous damping medium, including a piston ring having an outside diameter larger than the outside diameter of said piston means to impede flow of said viscous damping medium relative to said oscillating piston means, but smaller than the inside diameter of said cylinder means to provide clearance between said piston ring and said cylinder means; and
means operatively associated with said piston means for sensing said damped oscillation.

2. A vibration transducer as claimed in claim 1, wherein:
said piston ring has a recess in its periphery for adjusting said damping.

3. A vibration transducer as claimed in claim 1, wherein:
said piston means include piston ring retaining means defining a peripheral channel for receiving part of said piston ring, said channel having an inside diameter smaller than the inside diameter of said piston ring and a height larger than the height of said piston ring whereby said piston ring is floating relative to said piston means and said cylinder means.

4. A vibration transducer as claimed in claim 1, wherein:
said piston means have a bore;
said mounting means include a post extending through said bore and having a diameter smaller than the diameter of said bore; and
said damping means include an annulus about said post having an inside diameter smaller than the inside diameter of said bore to impede flow of said viscous damping medium through said bore, but larger than said diameter of the post to provide clearance between the annulus and the post.

5. A vibration transducer as claimed in claim 4, wherein:
said piston means include annulus retaining means defining an annular chamber for receiving part of said annulus, said chamber having a diameter larger than the outside diameter of said annulus and a height larger than the height of said annulus whereby said annulus is floating relative to said piston means and said post.

6. A vibration transducer comprising in combination:
a seismic mass;
cylinder means for enclosing a viscous damping medium and housing said seismic mass;
means for mounting said seismic mass for oscillation in said cylinder, including first and second spring suspension means, means for mounting said first suspension means on one side of said mass and said second suspension means on another side of said mass, means for suspending said mass between said mounted first and second spring suspension means, and a bridge extending between said first and second spring suspension means and having a rod extending through and at a clearance to said mass;
means for damping said oscillation of the mass with said viscous damping medium, including an annulus about said rod having an inside diameter smaller than said clearance to impede flow of said viscous damping medium through said clearance, but larger than the diameter of said rod to provide clearance between the annulus and the rod; and
means operatively associated with said mass for sensing said damped oscillation.

7. A vibration transducer as claimed in claim 6, wherein:
said mass includes annulus retaining means defining an annular chamber for receiving part of said annulus, said chamber having a diameter larger than the outside diameter of said annulus and a height larger than the height of said annulus whereby said annulus is floating relative to said mass and said rod.

8. A vibration transducer comprising in combination:
cylinder means for enclosing a viscous damping medium;
piston means in said cylinder means having an axial bore and an outside diameter smaller than the inside diameter of said cylinder means and having a seismic mass;
means for mounting said piston means for axial oscillation in said cylinder means including a support having a post extending through said axial bore and having a diameter smaller than the diameter of said bore, a bridge having a first end portion, a second end portion and a rod extending between said first and second end portions and through said piston means at a clearance to said piston means, a first C-shaped spring connected to and extending between said support and said first end portion of the bridge, a second C-shaped spring connected to and extending between said piston means and said first end portion of the bridge, a third C-shaped spring connected to and extending between said piston means and said second end portion of the bridge, and a fourth C-shaped spring connected to and extending between said support and said second end portion of the bridge;
means for damping said oscillation of the piston means with said viscous damping medium, including a piston ring having an outside diameter larger than the outside diameter of said piston means to impede flow of said viscous damping medium relative to said oscillating piston means, but smaller than the inside diameter of said cylinder means to provide clearance between said piston ring and said cylinder means, piston ring retaining means in said piston means including a peripheral channel for receiving part of said piston ring having an inside diameter smaller tha the inside diameter of said piston ring and a height larger than the height of said piston ring whereby said piston ring is floating relative to said piston means and said cylinder means, a first annulus about said post having an inside diameter smaller than the inside diameter of said bore to impede flow of said viscous damping medium through said bore, but larger than said diameter of said post to provide clearance between the first annulus and the post, and first annulus retaining means in said piston means defining a first annular chamber for receiving part of said first annulus having a diameter larger than the outside diameter of the first annulus and a height larger than the height of the first annulus whereby the first annulus is floating relative to the piston means and said post, a second annulus about said rod having an inside diameter smaller than the clearance at which said rod extends through the piston means to impede flow of said viscous damping medium through the latter clearance, but larger than the diameter of said rod to provide clearance between the annulus and the rod, and second annulus retaining means in said piston means defining a second annular chamber for receiving part of said second annulus having a diameter larger than the outside diameter of the second annulus and a height larger than the height of the second annulus whereby the second annulus is floating relative to the piston means and said rod; and means operatively associated with said piston means for sensing said damped oscillation.

9. A vibration transducer as claimed in claim 8, wherein:
said piston means include a magnet and spaced pole pieces; and
said sensing means include electromagnetic bobbin means on said cylinder means.

10. A vibration transducer as claimed in claim 8, wherein:
said piston means include a magnet and spaced circular pole pieces; and
said peripheral channel, said first annular chamber and said second annular chamber are provided in at least one of said pole pieces.

11. A vibration transducer comprising in combination:
cylinder means for enclosing a viscous damping medium;
piston means in said cylinder means having an outside diameter smaller than the inside diameter of said cylinder means and having a seismic mass;
means for mounting said piston means for axial oscillation in said cylinder means including spring suspension means being flexible in an axial direction in said cylinder means and having maximum stiffness at right angles to said axial direction to retain said piston means against radial movement relative to said cylinder means;

means for damping said oscillation of the piston means with said viscous damping medium including a floating seal between said piston means and said cylinder means; and means operatively associated with said piston means for sensing said damped oscillation.

12. A vibration transducer as claimed in claim 11, wherein:

said mounting means include a post for mounting said spring suspension means; and said damping means include a second floating seal between said piston means and said post.

13. A vibration transducer comprising in combination:

cylinder means for enclosing a viscous damping medium;

piston means in said cylinder means having an outside diameter smaller than the inside diameter of said cylinder means and having a seismic mass;

means for mounting said piston means for axial oscillation in said cylinder means including spring suspension means being flexible in an axial direction in said cylinder means and having maximum stiffness at right angles to said axial direction to retain said piston means against radial movement relative to said cylinder means, said mounting means including a post for spring suspension means and said spring suspension means being mounted on said post on both sides of said piston means and including a bridge extending from one side to the opposite side of said piston means;

means for damping said oscillation of the piston means with said viscous damping medium including a first floating seal between said piston means and said cylinder means, a second floating seal between said piston means and said post, and a third floating seal between said piston means and said bridge; and means operatively associated with said piston means for sensing said damped oscillation.

* * * * *